US010303751B1

United States Patent
Gross (10) Patent No.: US 10,303,751 B1
(45) Date of Patent: May 28, 2019

(54) SYSTEM AND METHOD FOR INTERACTION COVERAGE

(71) Applicant: Google LLC, Mountain View, CA (US)

(72) Inventor: Stephen Gross, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 19 days.

(21) Appl. No.: 15/798,003

(22) Filed: Oct. 30, 2017

Related U.S. Application Data (63) Continuation of application No. 15/087,451, filed on Mar. 31, 2016, now Pat. No. 9,824,075.

(51) Int. Cl.
| | | |
|---|---|---|
| *G06F 17/20* | (2006.01) | |
| *G06F 17/22* | (2006.01) | |
| *G06F 17/24* | (2006.01) | |
| *G06F 3/048* | (2013.01) | |

(52) U.S. Cl.
CPC .......... *G06F 17/2247* (2013.01); *G06F 3/048* (2013.01); *G06F 17/243* (2013.01); *G06F 17/248* (2013.01)

(58) Field of Classification Search
None
See application file for complete search history.

(56) References Cited

U.S. PATENT DOCUMENTS

| | | | | |
|---|---|---|---|---|
| 7,447,706 B2* | 11/2008 | Chtcherbatchenko | ........................ | |
| | | | | G06F 17/2247 |
| 8,707,177 B1* | 4/2014 | Parle | ........................ | G06F 9/453 |
| | | | | 715/705 |
| 9,201,852 B2* | 12/2015 | Ge | ........................ | G06F 17/245 |
| 2006/0224553 A1* | 10/2006 | Chtcherbatchenko | ........................ | |
| | | | | G06F 17/2247 |
| 2007/0061710 A1* | 3/2007 | Chartier | ................ | G06F 17/212 |
| | | | | 715/234 |
| 2010/0023878 A1* | 1/2010 | Douris | ................ | H04L 12/6418 |
| | | | | 715/757 |

(Continued)

OTHER PUBLICATIONS

Fard, et al. "Leveraging Existing Tests in Automated Test Generation for Web Applications", In Proceedings of the 29th ACM/IEEE international conference on Automated software engineering, Sep. 15-19, 2014, Vasteras, Sweden (12 pages).

(Continued)

*Primary Examiner* — Keith D Bloomquist
(74) *Attorney, Agent, or Firm* — McDermott Will & Emery LLP (57) ABSTRACT

A system and method for interactive test coverage are disclosed. An example embodiment receives a document object model representation of a user interface page and determines at least one visible and interactive element in the document object model. If there are multiple visible interactive elements, an example embodiment creates a CSS selector for each element. A CSS selector identifies the element by information including ancestry tags from a root node to a leaf node. In one embodiment, a determination is made regarding whether the current CSS selector is similar to previously-stored CSS selectors. An example embodiment stores the CSS selector when no previously-stored CSS selectors are similar. A user interface test is executed and a determination is made as to whether the elements represented by the stored CSS selectors were invoked by the test. Results from the test execution can be displayed to a user via a user interface display.

22 Claims, 6 Drawing Sheets

(56) References Cited

U.S. PATENT DOCUMENTS

| | | | | |
|---|---|---|---|---|
| 2012/0005572 | A1* | 1/2012 | Rundle | G06F 17/2235 715/235 |
| 2012/0173967 | A1* | 7/2012 | Lillesveen | G06F 17/227 715/235 |
| 2013/0283384 | A1* | 10/2013 | Jiang | G06F 21/10 726/26 |
| 2014/0289218 | A1* | 9/2014 | Levens | G06F 17/30867 707/710 |
| 2015/0128028 | A1* | 5/2015 | Scoda | G06F 17/30896 715/236 |
| 2015/0135061 | A1* | 5/2015 | Palanichamy | G06F 17/2247 715/235 |
| 2015/0149916 | A1* | 5/2015 | Mendez | G06F 17/30873 715/738 |
| 2015/0169318 | A1* | 6/2015 | Nash | G06F 8/656 717/168 |
| 2015/0199323 | A1* | 7/2015 | Sultanik | G06F 17/241 715/230 |
| 2015/0205884 | A1* | 7/2015 | Leventhal | G06F 17/2247 715/234 |
| 2015/0234734 | A1* | 8/2015 | Agrawal | G06F 11/3688 714/38.1 |
| 2015/0234798 | A1* | 8/2015 | Mocanu | G06F 17/2247 715/236 |
| 2015/0264423 | A1* | 9/2015 | Torgemane | G06F 8/30 715/719 |
| 2015/0350450 | A1* | 12/2015 | Rose | H04M 3/564 715/753 |
| 2016/0065528 | A1* | 3/2016 | Weksler | H04L 51/24 709/206 |
| 2016/0162140 | A1* | 6/2016 | Nasson | H04L 67/02 715/738 |
| 2017/0097927 | A1* | 4/2017 | Levi | G06F 17/2705 |

OTHER PUBLICATIONS

Mirzaaghaei, et al. "DOM-Based Test Adequacy Criteria for Web Applications" In Proceedings of the 2014 International Symposium on Software Testing and Analysis, Jul. 21-25, 2014, San Jose, CA, USA (11 pages).

"Mutation Observer" downloaded from https://developer.mozilla.org/en-US/docs/Web/API/MutationObserver on Mar. 30, 2016, pp. 1-4.

Notice of Allowance dated Jul. 13, 2017 in U.S. Appl. No. 15/087,451.

* cited by examiner

FIG. 1a

```
<html>
  <select>
    <option value = "">Select Location</option>
    <option value="somewhere">Somewhere</option>
    <option value = "there">There</option>
  </select>
</html>
```

FIG. 1b

```
<html>
  <ul>
    <li><a class="special_link" href="somewhere">somewhere</a>
    <li><a class="special_link" href="there">there</a>
  </ul>
</html>
```

```
<html>
<ul>
<li><a class="special_link" href="somewhere">somewhere</a>
<li><a class="special_link" href="there">there</a>
<li><a class="special_link" href="here">here</a>
</ul>
</html>
```

FIG. 3a

Somewhere
There
Here

SYSTEM AND METHOD FOR INTERACTION COVERAGE

RELATED APPLICATIONS

The present application is a continuation of, and claims the benefit of and priority to, U.S. patent application Ser. No. 15/087,451, entitled "A SYSTEM AND METHOD FOR INTERACTION COVERAGE," and filed on Mar. 31, 2016, the entire contents of which are hereby incorporated for reference.

BACKGROUND

Figure 1A:
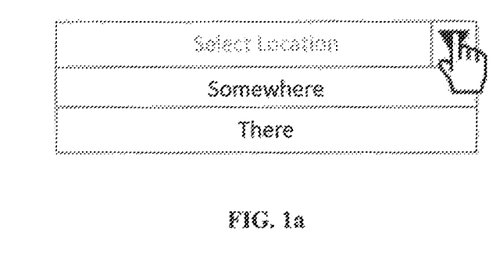
FIG. 1a is a block diagram illustrating an example document object model.
Figure 1B:
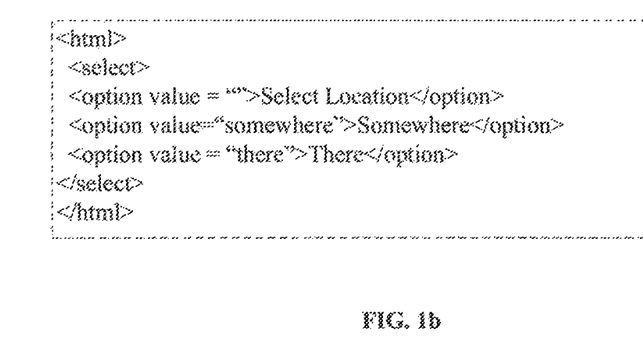

A common way to test a graphical user interface ("GUI") is with an automated user interface ("UI") test. A UI test simulates a user's actions, typically by launching a browser, navigating to the application-under-test ("AUT"), and executing simulated user interactions (for example, clicking on a link, entering text in a field, etc.). Developers or testers may create several UI tests that together make up a suite of UI tests to exercise a range of functionality for an AUT. For example, there may be a selection menu as shown in FIG. 1b in an application. The selection menu may allow the user choose a location by clicking on a dropdown menu and making a selection from a list. In order to test this selection menu functionality, there may be a test that simulates the user clicking on the dropdown and choosing an option.

However, in customary testing suites it is difficult to determine if the tests sufficiently exercise all functionality of an AUT. For example, a user interface may have five clickable links and three text fields. In order to fully test the functionality of the user interface, all or some combination of these links and fields need to be tested. Although there is plenty debate in the industry on the subject of UI testing and whether it is sufficient to click on everything that can be clicked or whether it is necessary to test all possible combinations of text in a text field, there is little consensus on the totality of tests that are required to properly test all UI functionality.

As recognized by the inventor, there should be an objective and quantitative solution for testing UI functionality.

SUMMARY

This specification describes technologies relating to user interface testing in general, and specifically to methods and systems for providing test coverage for interactive elements on a user interface.

In general, one aspect of the subject matter described in this specification can be embodied in a system and method for interaction test coverage. An example system may include: one or more processing devices and one or more storage devices storing instructions that, when executed by the one or more processing devices, cause the one or more processing devices to execute an example method. An example method may comprise receiving a document object model representation of a user interface page; determining at least one visible and interactive element in the document object model; for each visible and interactive element in the document object model, creating a CSS selector identifying the element by information including ancestry tags from a root node to a leaf node, determining whether the CSS selector is similar to a previously-stored CSS selector, and responsive to determining that the CSS selector is not similar to a previously-stored CSS selector, storing the CSS selector; executing at least one user interface test; determining the elements represented by the CSS selectors that the user interface test invoked as test coverage results; and displaying the test coverage results to a user in a user interface display.

These and other embodiments can optionally include one or more of the following features: determining at least one visible and interactive element in the document object model may include identifying the element's type or tag; determining at least one visible and interactive element in the document object model may include identifying an element's compatibility with a specific javascript layout or web templating system; determining at least one visible and interactive element in the document object model may include identifying whether the element has an event listener; storing the CSS selector may include adding the CSS selector to an in-memory registry that is maintained during the course of test execution; the in-memory registry may store information related to an interactive element including the element's CSS selector, an associated screenshot name, screen coordinates, or a call count; and determining at least one visible and interactive element in the document object model may include determining visibility of the element's entire ancestry. Additionally, creating a CSS selector may include: initializing a CSS selector; determining an element's ancestry; and pre-pending an element's tag and identifier for each element in the ancestry from the leaf to the root node. Creating a CSS selector may alternatively include: initializing a CSS selector; determining an element's ancestry; and pre-pending an element's tag and CSS classes for each element in the ancestry. Further features may include: displaying test coverage results to a user in a user interface display that may include merging per-test coverage results into a single, merged coverage summary; the merge process may be done by a pairwise comparison of all elements to determine whether the elements should be considered identical; two elements may be considered identical when the trailing N nodes of the CSS selectors for the two elements are the same; and two elements may be considered identical when they share at least N classes.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1b is a block diagram illustrating an example user interface display based on the document object model of FIG. 1a.

FIG. 2b is a block diagram illustrating an example user interface display based on the document object model of FIG. 2a.

FIG. 3b is a block diagram illustrating an example user interface display based on the document object model of FIG. 3a.

DETAILED DESCRIPTION

According to an example embodiment, a mechanism for testing user interface may be provided that identifies interactive elements on a user interface, records when interaction events occur during UI test execution, merges interaction coverage data results, and presents the merged coverage information in human-readable format so that testing coverage for the user interface may be determined and displayed.

To identify interactive elements in a user interface, an example embodiment searches the document object model (DOM) of the UI. The DOM is a programming interface for documents such as hyper text markup language (HTML), extensive markup language (XML), and scalable vector graphics (SVG). It is present so long as the application is active and typically mutates in response to user action. It can also independently mutate based on automatic changes to the UI.

The DOM provides a structured representation of elements existing in the document in a tree format. Each element of the UI is defined in the DOM. The DOM may also define a way that the structure can be accessed from programs so that the programs can change the document structure, style, or content. FIG. 1a illustrates part of the DOM that creates the selection menu for selecting a location as discussed above. There is a select box with three options.

Determining whether a DOM element is interactive can be difficult. There is no single way to make this determination. Instead, an example embodiment may look at several factors of the DOM element including: the type of element or tag; the element's compatibility with a specific javascript layout or web templating system; or whether the element has an event listener. For example, elements with anchor tags, input tags, option tags, or button tags may be considered interactive based on their tag type. An example embodiment may also detect interactive elements by including a window-level event listener at the highest priority so that the listener is executed before all other event listeners and listens for all interactive events. The example event listener may, when called, register the element as an interactive element and increment the call count for the element. A registry may be maintained in-memory during the course of test execution. Each item in the registry may be an interactable element. For each element, the registry may store: (1) the element's CSS selector (as described below), (2) an associated screenshot name, (3) screen coordinates, and (4) a call count, which is the number of times with which a test has interacted with the element during the test execution.

An example embodiment may continuously scan the DOM during test execution to detect the presence of interactive elements as they appear in the DOM and may register them with the registry. When an interaction occurs during the test execution, an example embodiment may intercept the interaction, increment the call count for the interacted element, and then allow the interaction to proceed.

During UI test execution, an application under test may be intercepted and analyzed. An example embodiment analyzes the DOM to find interactive elements. These elements may be found either by scanning the DOM or by listening to interactive events that are triggered on the UI.

In one embodiment, a browser extension may intercept and analyze an application under test. The browser extension may use a DOM mutation observer, which is an object that provides developers with a way to react to changes in a DOM, to determine changes to the DOM. A DOM mutation observer may scan the DOM to register interactive elements and may also register interactive elements at the time of interaction. Alternatively, the DOM may be scanned only at the time of interaction. However, a system using this approach may fail to notice interactive elements that appear and disappear within the DOM independently of interactions themselves.

The DOM mutation observer may identify all elements that changed in the DOM by providing the current state of the user's interface's DOM and a previously stored version for comparison. Changes can be assessed from the differences between the previous version to the current version.

Figure 2A:
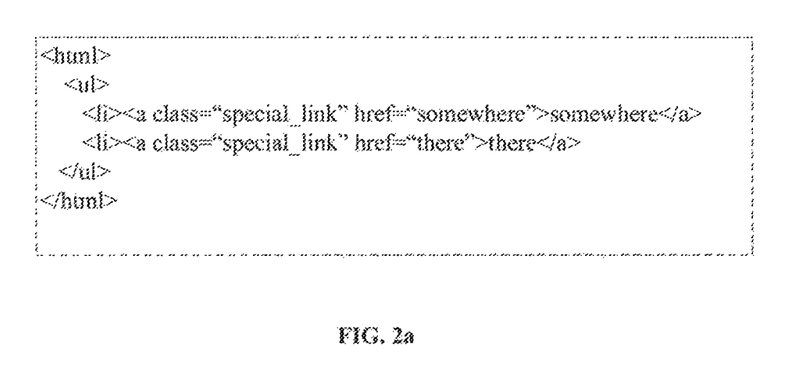
FIG. 2a is a block diagram illustrating an example document object model.
Figure 2B:
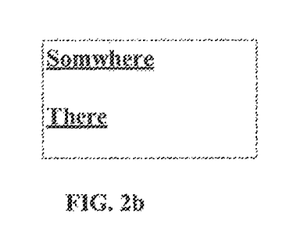

For example, FIG. 2a may represent an initial DOM of a user interface. In this DOM, there is an unordered list with two list items, "somewhere" and "there," which are both anchor tags that define hyperlinks to other page locations. FIG. 2b illustrates the UI as seen by the user.

The example DOM mutation observer may record an initial DOM for a user interface page. An example embodiment may take a screenshot, or record in some other manner, the DOM of the user interface at the current time. The screenshot may illustrate the elements associated with a user interface.

An example DOM mutation observer may identify S as the set of all elements that have changed, or are new, in the DOM since its last observation. In an initial view of the DOM, the DOM mutation observer may record the current state of the DOM. For example, in the initial DOM, there are two list items that are anchor tags. These elements are therefore treated as new. For each element, E, in S, the DOM mutation observer may perform several steps. First, the DOM mutation observer may determine if E is visible on the UI. Per-element visibility may depend on computed style and non-empty size of the element in the DOM. For example, an element may be denoted as having visibility hidden or its display may be set to "none."

In an example embodiment, visibility of a particular element may be determined by the visibility of the element's entire ancestry. Each ancestor of the element as determined by the DOM structure should be visible in order to consider the element visible. In this example as shown in FIG. 2a, both list elements are visible. If E is not visible, the DOM mutation observer may skip to the next element.

An example embodiment may then determine if element E is interactive based on the determination disclosed above. In this example case, the list elements are anchor tags, which are hyperlinks. The hyperlinks can be clicked to go to other page locations, making the tags interactive. If the element is not interactive, the DOM mutation observer may skip to the next element.

If element E has been determined to be visible and interactive, as is the case with the example "somewhere" and "there" list items, a cascading style sheet (CSS) selector, C, may be formulated to identify each E. When identifying an element, each field representing E may be composed of a single tag and may either have an identifier or zero or more classes.

In order to calculate an element's CSS selector, an example embodiment may find the ancestry, A, of the element sorted from leaf node (element) to root node. A CSS selector, C, may be initialized. For each element E in the ancestry, A, if E has an identifier, element E's tag and identifier may be pre-pended to C in the format: <tag>.<id>. If E has CSS classes, element E's tag and css classes may pre-pended to C in the format: <tag>.<class1> . . . <classN>.

For example, as shown in FIG. 2a, CSS selectors may be determined for both anchor tags that are list items in the unordered list. As discussed above, an example embodiment may determine that both anchor tags in the example DOM, denoted by <a></a> above, are visible and interactive. As such, CSS selectors should be created for them. An example embodiment will initialize a CSS selector and traverse the ancestry of the tag from the leaf to the root. Since neither anchor tag is associated with an identifier, each CSS selector should first be prepended with the tag and the class name as discussed above. In this example, each leaf tag is an anchor tag, denoted by "a" and the class name is "special_link". Therefore, the CSS selector will receive the tag and class name: "a.special_link." The CSS selector will then look to the anchor tag's immediate ancestor, which is an <li> tag, a list item. The "li" will prepended to the CSS selector so that the CSS selector now holds the value: "li a.special_link." The <li> tag's parent is an unordered list tag, <ul>. This tag will be prepended to the CSS selector so that the selector then holds the value "ul li a.special_link." The <ul> tag's parent is an <html> tag. The <html> tag is also the root tag. The <html> tag is prepended to the CSS selector so that the selector contains all elements in the ancestry from the anchor element to the root element, <html>: "html ul li a.special_link."

Although these two anchor tags denote two interactive elements, an example embodiment will generate the same selector for both: "html ul li a.special_link." Even though the two elements are different in the DOM, for the purposes of interaction coverage reporting, the elements should be treated as identical. To determine interactive coverage, only one test for a group of the same CSS selector tag needs to be executed since testing the interaction with one element of the type should sufficiently test the interaction with the other elements of the same type. The testing behavior of one element should be representative of the behavior of all elements of the same type. For the purpose of interaction coverage, it may only matter that there is a test that clicks at least one of the list elements, not that there are tests for clicking every single list element.

Figure 3A:
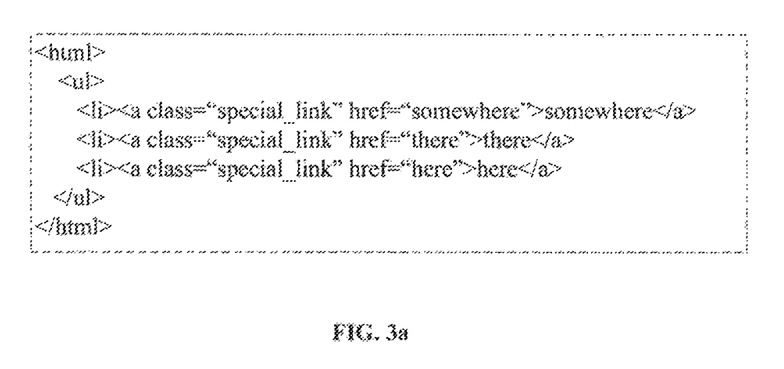
FIG. 3a is a block diagram illustrating an example document object model.
Figure 3B:
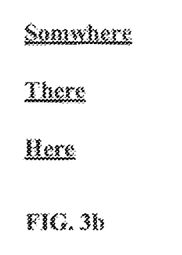

The DOM may be subsequently updated to include a third list item: "here," which is also an anchor tag hyperlink as shown in FIG. 3a. FIG. 3b illustrates the resulting UI as seen by the user. In this example, the DOM has been updated from FIG. 2a to include a new list item.

After a comparison is done from the initial to DOM to the current DOM, the updated element list may include this new list element. An example embodiment may make determinations on whether this element is visible and interactive. Upon determining that it is visible and interactive, an example embodiment may create a CSS selector for the element.

The CSS selector for the "here" anchor tag list element may also be determined to be "html ul li a.special_link" based on the leaf to root process described above. After the CSS selectors have been identified, if the CSS selector matches a previously-identified CSS selector, an example embodiment may skip to the next element. Otherwise, the CSS selector may be recorded. In this case, the CSS selector matches the previously-identified CSS selector for the other list items and is therefore not recorded.

Metainformation about the element may also be recorded in the registry. Metainformation may include element coordinates, size, or a screenshot. An example embodiment may force all CSS transitions to complete. A CSS transition is a mechanism that facilitates a gradual change of an element from one user interface state to another. For example, an element's opacity might change from 0.0 (transparent) to 1.0 (fully opaque) over several seconds. A CSS transition may define aspects of a transition including: delay, duration, transition property, and the timing function of the transition. An example embodiment may then record the state of the UI and/or the DOM structure after all the CSS transitions have completed. For each recorded element, E, an example embodiment checks the post-animation coordinates and the size of E. If any information associated with E has changed, the metainformation associated with E may be updated to reflect the changes. A post-animation screenshot or other record may be stored and associated with the element.

Figure 4:
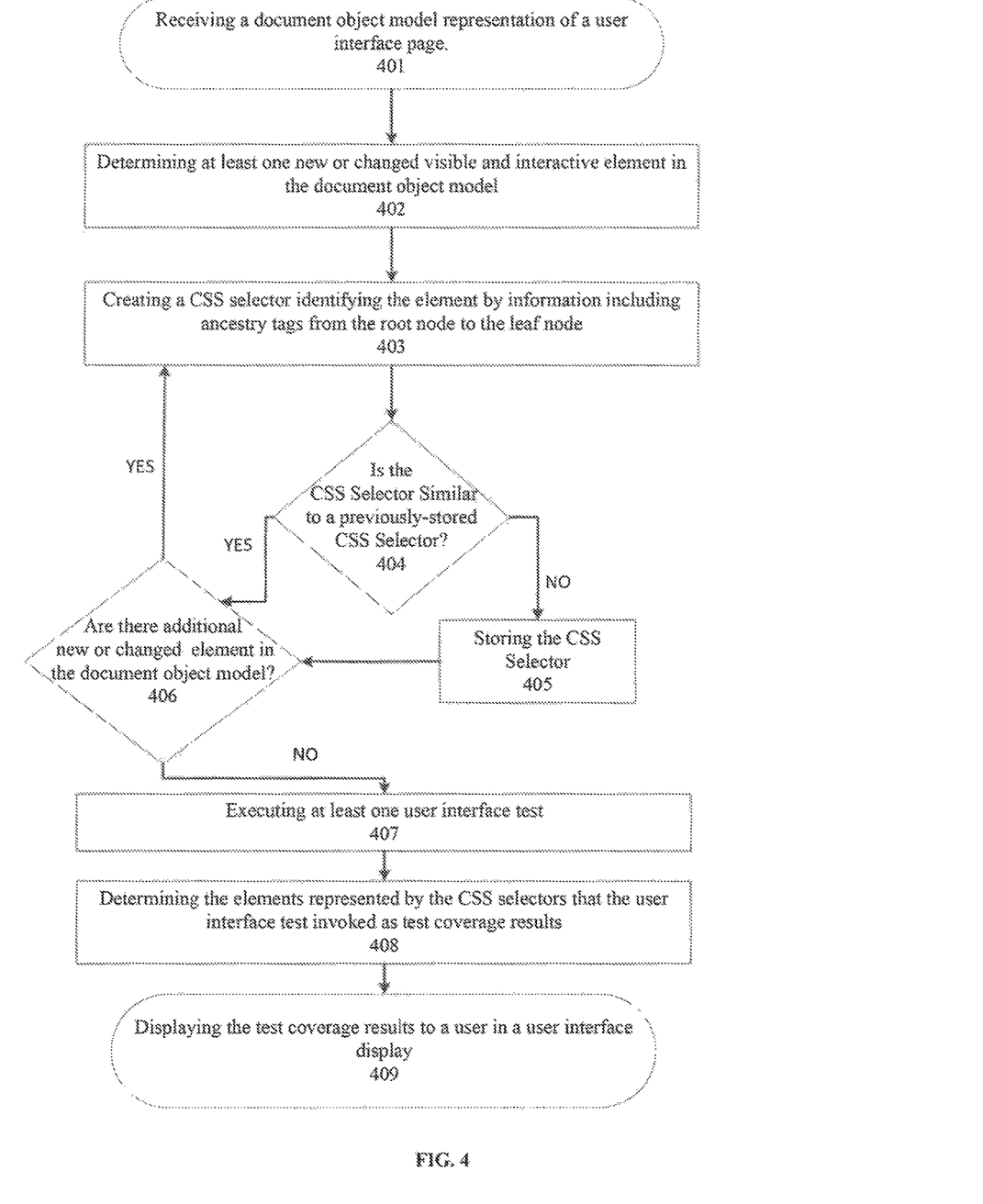
FIG. 4 is a flow diagram of an example method for providing test coverage for interactive elements on a user interface.

An example embodiment may include a list of CSS selectors along with metainformation as shown in FIG. 4. Metainformation may include any information that can be associated with a given CSS selector such as dimension, location, and callcount.

In some instances, an element may be removed from the user interface during the course of interaction. For example, a dialog box may appear that has an interactive element in it (e.g. an "OK" button). Once a user clicks, "OK," (or an automated test simulates a user click) the dialog box disappears and the "OK" button is removed from the user interface. However, this interaction will still appear on the interactive coverage report since the "OK" button has been acted upon.

There may be multiple tests that may be part of a test suite for the user interface. All tests may run against the UI to determine the UI's functionality. After the UI tests run, an example embodiment may merge the per-test coverage results into a single, merged coverage summary.

The merge process may be done by a pairwise comparison of all elements to determine whether the elements should be considered identical. The pairwise comparison may be the complete set of interactive elements, meaning that every interactive element may be compared against every other interactive element. In an example embodiment, there may be at least two methods for determining whether elements should be considered identical.

In one example method, the CSS selectors for two elements may be compared and if the trailing N nodes are the same, the elements may be considered identical. For example there may be two CSS selectors, one defined as "html div p ul tr a div" and a second defined as "table tr ul tr a div." A default value for N may be, for example, four.

An example embodiment may choose a default value for N to prevent undermerging and overmerging. Undermerging is merging, but failing to understand that two elements should be treated as identical. Overmerging is merging, but incorrectly treating two non-identical elements as identical. In an example embodiment, as the number of trailing nodes, N, approaches infinity, there may be aggressive undermerging. As the number of trailing nodes, N, approaches zero, there may be aggressive overmerging. An example default value may be obtained by trial-and-error.

Therefore an example embodiment will compare the last four elements of the two CSS selectors. The last four of selector one are: "ul tr a div." The last four of selector two are: "ul tr a div." Since these four elements in the selectors are identical, the elements represented by selector one and selector two may be considered identical.

In a second example method, two elements may be considered identical if they share at least N classes. A default number for N may be 1 although this number may be set.

Default settings may be set by a user in a configuration file that is read by an example embodiment. For example, a selector for one element may be "tr a.foo.bar div." A selector for a second element may be "tr a.bar.zip div." If N is 1, then both of these anchor tags will be considered identical because the anchor tag in both CSS selectors share a common class, "bar." If elements are considered identical, only one element is preserved. The other element's callcount is added to the preserved element and will be considered called when the preserved element is called.

Figure 6:
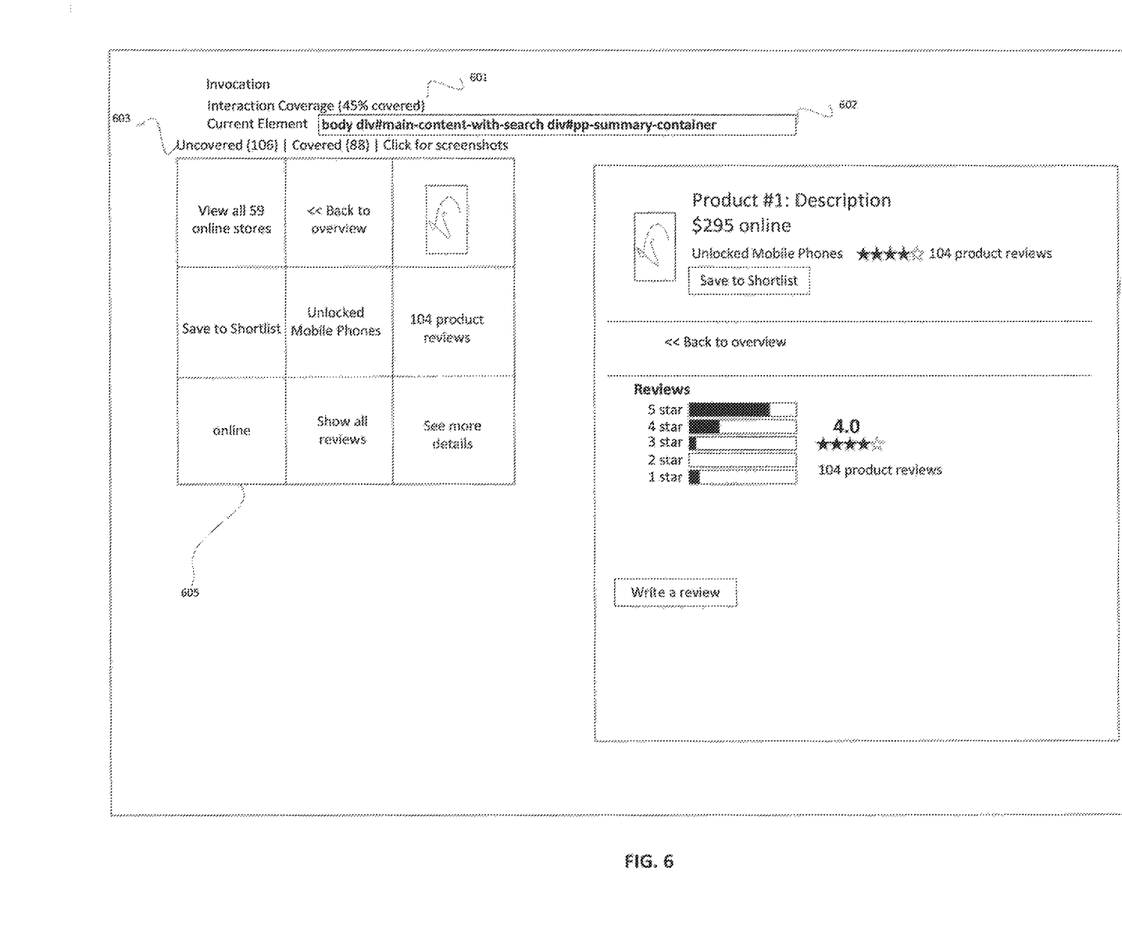
FIG. 6 is an example user interface showing an example interactive coverage report.

Results of interactive test coverage may be displayed to a user through an interactive test coverage report that contains information regarding elements that were and were not clicked on a UI as illustrated in FIG. 6. An interactive test coverage report may include details such as the overall coverage percentage of a UI (601). An example report may also include the number of uncovered elements (603). These elements may be displayed as thumbnails representing the uncovered elements. This number may indicate the number or percent of elements that were not clicked at least once. Each uncovered element may be displayed with the CSS selector for the element and a screenshot. There may also be an indication that the element was one with which tests did not interact. For example, there may be red highlighting around the element in the screenshot.

An example report may additionally include the number of covered elements for a particular UI (603). In an example embodiment, a list of thumbnails representing covered elements may be displayed (605). As with the uncovered elements, each covered element may be displayed with the CSS selector for the element and a screenshot. There may also be an indication that the element was one with which tests did interact. For example, there may be green highlighting around the element in the screenshot. An example embodiment may display an interactive report with a screenshot of the user interface that was subject to test as shown in FIG. 6 (603).

Figure 5:
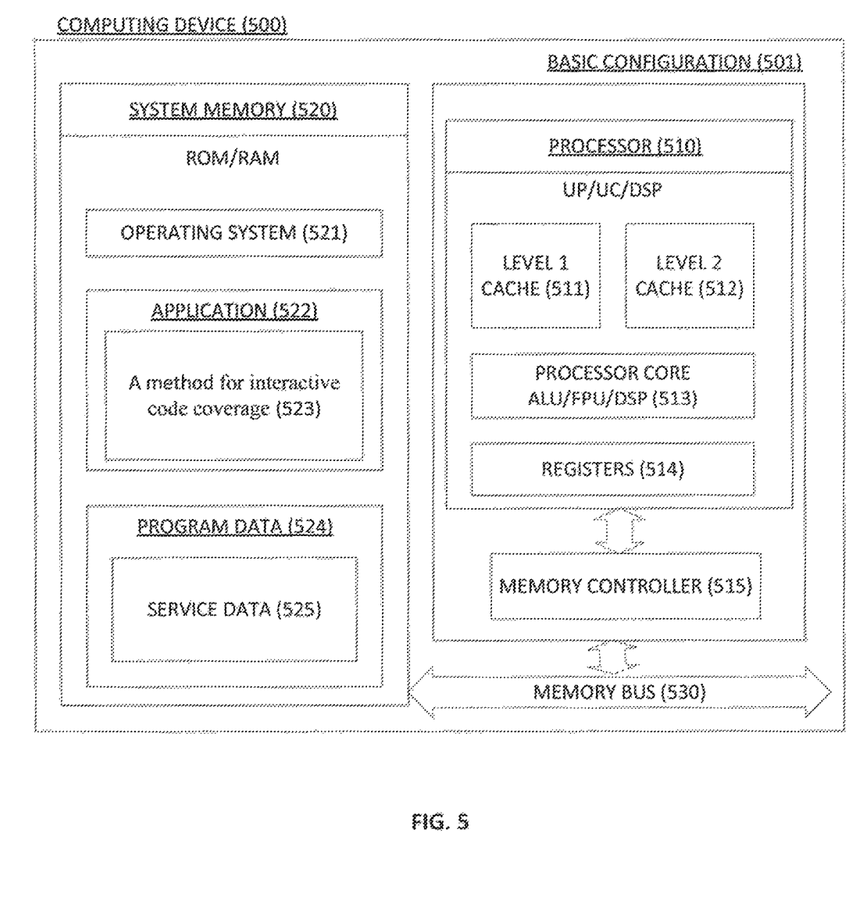
FIG. 5 is a block diagram illustrating an example computing device.

FIG. 5 is a high-level block diagram of an example computer (500) that is arranged for user interface testing and for providing test coverage information for interactive elements on a user interface. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (μP), a microcontroller (μC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (516) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a system for providing test coverage for interactive elements on a user interface.

Program Data (524) includes storing instructions that, when executed by the one or more processing devices, implement a system and method for user interface testing and for providing/displaying test coverage.

(523). In some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for interaction test coverage, the computer-implemented method comprising:
    receiving a document object model representation of a user interface page;
    determining at least one visible and interactive element in the document object model;
    for each visible and interactive element in the document object model,
        creating a first CSS selector identifying the element by information including ancestry tags from a root node to a leaf node;
        determining whether the first CSS selector is similar to a previously-stored second CSS selector; and
        responsive to determining that the first CSS selector is not similar to the second CSS selector, storing the first CSS selector;
    executing at least one user interface test, wherein the at least one user interface test results in the invoking of at least one of the stored CSS selectors;
    based on the at least one user interface test, generating test coverage results, wherein the test coverage results identify the elements associated with the CSS selectors invoked during execution of the user interface test; and
    displaying the test coverage results to a user in a user interface display.

2. The computer-implemented method of claim 1, wherein determining at least one visible and interactive element in the document object model includes identifying the element's type or tag.

3. The computer-implemented method of claim 1, wherein determining at least one visible and interactive element in the document object model includes identifying an element's compatibility with a specific javascript layout or web templating system.

4. The computer-implemented method of claim 1, wherein determining at least one visible and interactive element in the document object model includes identifying whether the element has an event listener.

5. The computer-implemented method of claim 1, wherein storing the first CSS selector includes adding the first CSS selector to an in-memory registry that is maintained during the course of test execution.

6. The computer-implemented method of claim 5, wherein the in-memory registry stores information related to an interactive element including the element's CSS selector, an associated screenshot name, screen coordinates, or a call count.

7. The computer-implemented method of claim 1, wherein determining at least one visible and interactive element in the document object model includes determining visibility of the element's entire ancestry.

8. The computer-implemented method of claim 1, wherein creating a first CSS selector includes:
    initializing a first CSS selector;
    determining an element's ancestry; and
    pre-pending an element's tag and identifier for each element in the ancestry from the leaf to the root node.

9. The computer-implemented method of claim 1, wherein creating a first CSS selector includes:
    initializing a first CSS selector;
    determining an element's ancestry; and
    pre-pending an element's tag and CSS classes for each element in the ancestry.

10. The computer-implemented method of claim 1, wherein displaying test coverage results to a user in a user interface display includes merging per-test coverage results into a single, merged coverage summary.

11. The computer-implemented method of claim 10, wherein the merge process is done by a pairwise comparison of all elements to determine whether elements should be considered identical.

12. The computer-implemented method of claim 11, wherein two elements are considered identical when the trailing N nodes of the CSS selectors for the two elements are the same.

13. The computer-implemented method of claim 11, wherein two elements are considered identical when they share at least N classes.

14. The computer-implemented method of claim 1, wherein responsive to determining that the first CSS selector is similar to the second CSS selector, the method further comprises not storing the first CSS selector and associating the element identified by the first CSS selector with the second CSS selector.

15. A system for interaction test coverage, the system comprising:
    one or more processing devices and
    one or more storage devices storing instructions that, when executed by the one or more processing devices, cause the one or more processing devices to:
        receive a document object model representation of a user interface page;
        determine at least one visible and interactive element in the document object model;
        for each visible and interactive element in the document object model,
            create a first CSS selector identifying the element by information including ancestry tags from a root node to a leaf node;
            determine whether the first CSS selector is similar to a previously-stored second CSS selector; and
            responsive to determining that the first CSS selector is not similar to a second CSS selector, store the first CSS selector;
        execute at least one user interface test, wherein the at least one user interface test results in the invoking of at least one of the stored CSS selectors;
        based on the at least one user interface test, generate test coverage results, wherein the test coverage results identify the elements associated with the CSS selectors invoked during the execution of the user interface test; and
        display the test coverage results to a user in a user interface display.

16. The system of claim 15, wherein determining at least one visible and interactive element in the document object model includes identifying the type of element or tag.

17. The system of claim 15, wherein determining at least one visible and interactive element in the document object model includes identifying an element's compatibility with a specific javascript layout or web templating system.

18. The system of claim 15, wherein determining at least one visible and interactive element in the document object model includes identifying whether the element has an event listener.

19. The system of claim 15, wherein storing the first CSS selector includes adding the first CSS selector to an in-memory registry that is maintained during the course of test execution.

20. The system of claim 19, wherein the in-memory registry stores information related to an interactive element including the element's CSS selector, an associated screenshot name, screen coordinates, or a call count.

21. The system of claim 15, wherein determining at least one visible and interactive element in the document object model includes determining visibility of the element's entire ancestry.

22. The system of claim 15, wherein responsive to determining that the first CSS selector is similar to the second CSS selector, the one or more processing devices are further configured to not store the first CSS selector and associate the element identified by the first CSS selector with the second CSS selector.

* * * * *